US006812924B2

(12) United States Patent
Kondo

(10) Patent No.: US 6,812,924 B2
(45) Date of Patent: Nov. 2, 2004

(54) APPARATUS AND METHOD FOR OBTAINING SHAPE DATA OF ANALYTIC SURFACE APPROXIMATE EXPRESSION

(75) Inventor: Koichi Kondo, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 287 days.

(21) Appl. No.: 09/817,148

(22) Filed: Mar. 27, 2001

(65) Prior Publication Data

US 2001/0029440 A1 Oct. 11, 2001

(30) Foreign Application Priority Data

Mar. 31, 2000 (JP) ........................................ 2000-099874

(51) Int. Cl.[7] .............................................. G06T 17/00
(52) U.S. Cl. ....................................................... 345/420
(58) Field of Search ................................ 345/581, 420, 345/619; 409/84

(56) References Cited

U.S. PATENT DOCUMENTS

| 4,890,242 | A | * | 12/1989 | Sinha et al. ................. 345/419 |
| 4,968,195 | A | * | 11/1990 | Hayakawa et al. ............ 409/84 |
| 5,999,188 | A |   | 12/1999 | Kumar et al. |
| 6,271,856 | B1 | * | 8/2001 | Krishnamurthy ............. 345/581 |
| 6,369,815 | B1 | * | 4/2002 | Celniker et al. ............. 345/420 |
| 6,452,604 | B1 | * | 9/2002 | Sato ........................... 345/619 |

OTHER PUBLICATIONS

Foley et al., Computer Graphics: Principles and Practice, 1997, Second Edition, p. 473.*

Michael Lounsbery, et al., "Parametric Surface Interpolation," IEEE Computer Graphics and Applications, Sep. 1992, pp. 45–52.

M. Eck, et al., Computer Graphics Proceedings, Annual Conference Series, XP–000682748, pp. 325–334, "Automatic Reconstruction of B–Spline Surfaces of Arbitrary Topological Type", Aug. 4, 1996.

M. Prinz, et al., Robotics & Computer–Integrated Manufacturing, vol. 12, No. 1, Xp–004000394, pp. 99–109, "From Cad–Based Kinematic Modeling to Automated Robot Programming", Mar. 1, 1996.

V. Krishnamurthy, et al., Computer Graphics Proceedings, Annual Conference Series, XP–000682747, pp. 313–324, "Fitting Smooth Surfaces to Dense Polygon Meshes", Aug. 4, 1996.

* cited by examiner

Primary Examiner—Mark Zimmerman
Assistant Examiner—Linzy McCartney
(74) Attorney, Agent, or Firm—Oblon, Spivak, McClelland, Maier & Neustadt, P.C.

(57) ABSTRACT

A method and apparatus for generating three-dimensional shape data in analytic surface expression form by using polygonal shape data. In the polygonal shape data, at least a portion of a shape is approximated by a combination of a plurality of polygons. A set of polygons is generated from the polygonal shape data, each of the polygons satisfying a predetermined selection criterion. An analytic surface is fitted in place of the obtained set of polygons. The step of fitting is repeated by obtaining another set of polygons until a predetermined termination condition is satisfied.

8 Claims, 17 Drawing Sheets

THIRD REFERENCE POLYGON OF POLYGON GROUP B

POLYGON SET WHICH NEIGHBORS THIRD REFERNCE POLYGON OF POLYGON GROUP B AND SATISFIES CRITERION

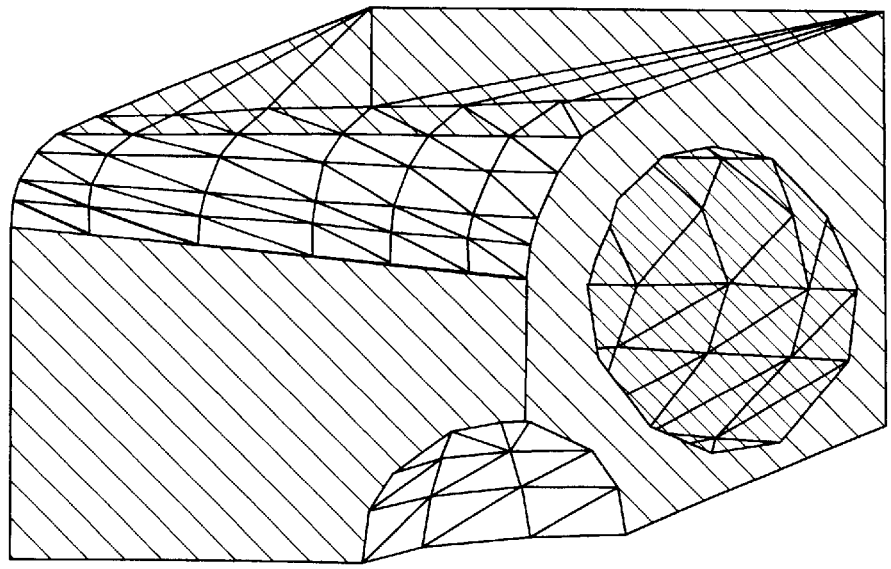
F I G. 13
FOURTH REFERENCE POLYGON OF POLYGON GROUP B
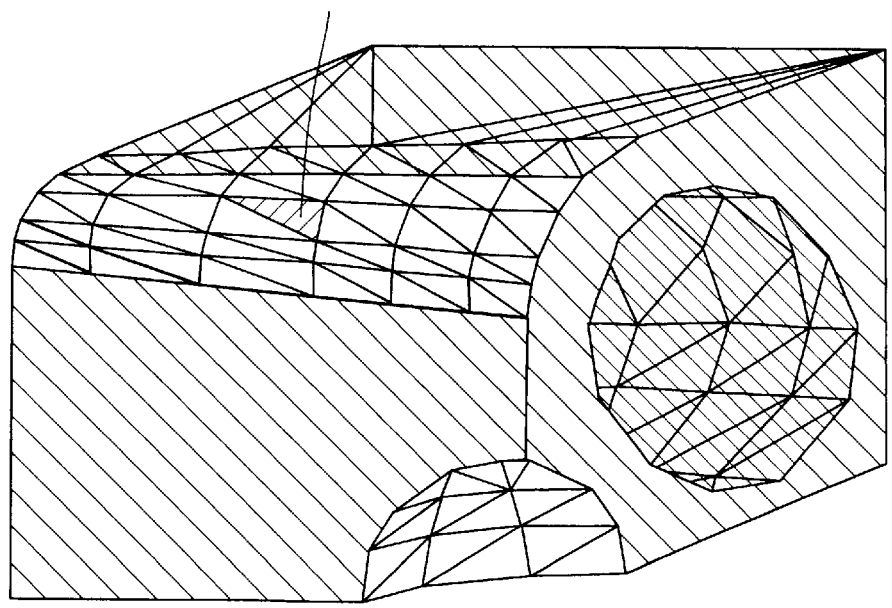
F I G. 14

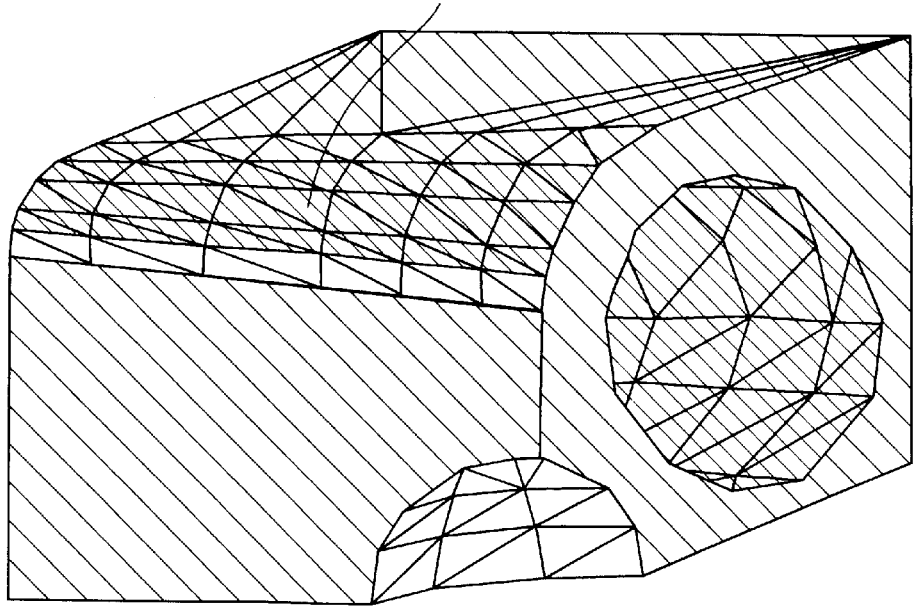
POLYGON SET WHICH NEIGHBORS FOURTH REFERNCE POLYGON OF POLYGON GROUP B AND SATISFIES CRITERION
F I G. 15
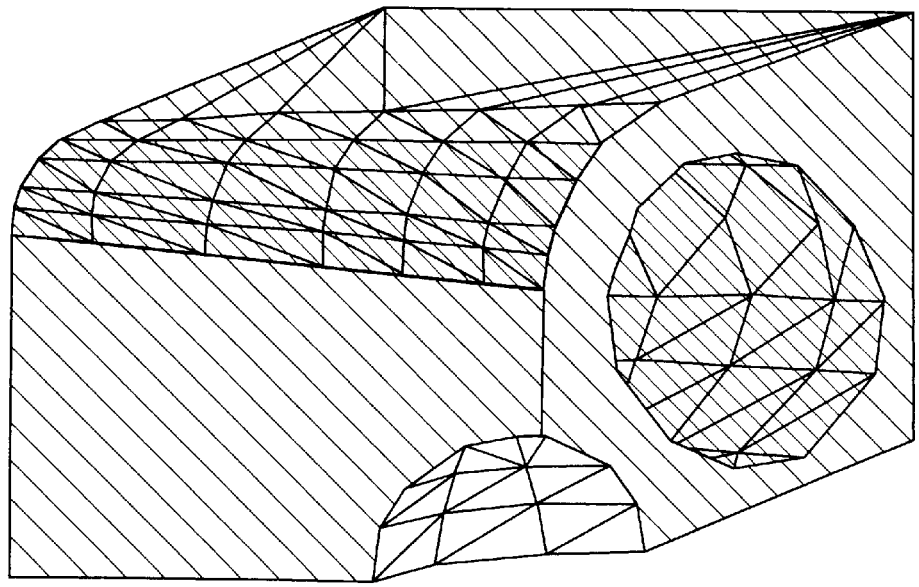
F I G. 16

FIFTH REFERENCE POLYGON OF POLYGON GROUP B

MOVEMENT RESULT OF POLYGONS AMONG
SURFACES TO OBTAIN BETTER FITTING RESULT
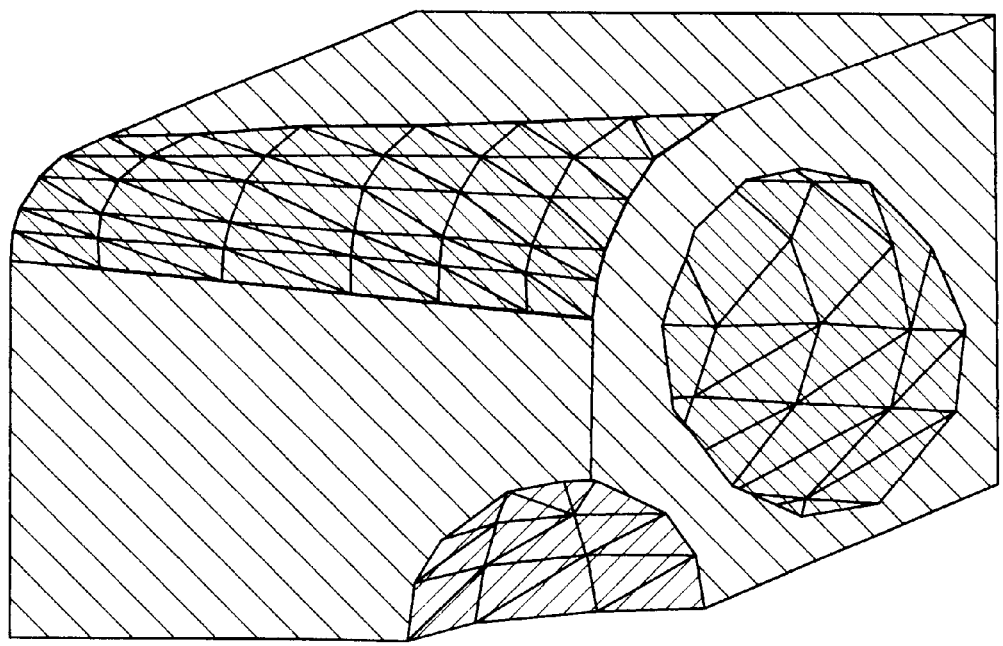
F I G. 19
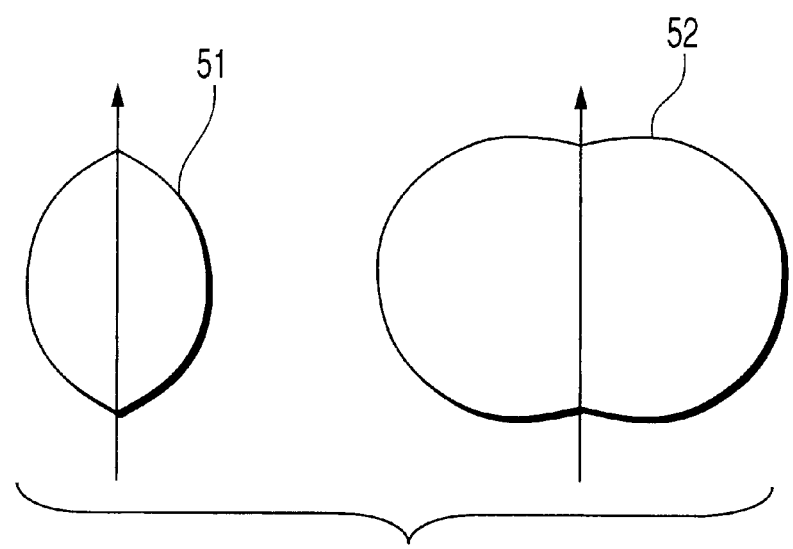
F I G. 20

APPARATUS AND METHOD FOR OBTAINING SHAPE DATA OF ANALYTIC SURFACE APPROXIMATE EXPRESSION

CROSS-REFERENCE TO RELATED APPLICATIONS

This application is based upon and claims the benefit of priority from the prior Japanese Patent Application No. 2000-099874, filed Mar. 31, 2000, the entire contents of which are incorporated herein by reference.

BACKGROUND OF THE INVENTION

The present invention relates to an apparatus and method for generating shape data of analytic surface approximate expression by use of three-dimensional shape data approximated by a combination of a plurality of polygons.

Nowadays, CAD (Computer Aided Design) systems, model generation software systems, computer animation software systems, and the like are used to efficiently design products such as machines, architectures, and the like.

VRML (Virtual Reality Modeling Language), which is a standard for exchanging and using three-dimensional shape information of components via the Internet, has been proposed, and is used in practice. Expression of shape data in VRML is an approximation of a three-dimensional shape of an object using a set of a plurality of polygons (polyhedron), and the shape data is widely distributed.

In a given CAD system, kinematic pairs such as coincidence, coaxial, and the like are defined among features (partial shapes such as a cylindrical surface, plane, and the like) as partial shapes of machine components for the purpose of aiding a complicated machine product design using a computer, the positional relationship among components in an assembly is defined and managed, and various functions such as assembly modeling, mechanism simulation, and interference check are implemented. These functions are essential features of a CAD system, and are very effective in design aid.

However, like as the above CAD system cannot use shape data by polyhedron approximation like in VRML. Hence, compatibility and reusability of shape data such as VRML must be improved.

BRIEF SUMMARY OF THE INVENTION

The present invention has been made in consideration of the above situation, and has as its object to provide an apparatus and method for obtaining shape data of analytic surface approximate expression which can be used in a CAD system having various functions such as assembly modeling, mechanism simulation, interference check, and the like.

According to one aspect of the present invention, there is provided a method of generating three-dimensional shape data in analytic surface expression form by using polygonal shape data in which at least a portion of a shape is approximated by a combination of a plurality of polygons, the method comprising: obtaining a set of polygons from the polygonal shape data, each of the polygons satisfying a predetermined selection criterion; fitting an analytic surface in place of the obtained set of polygons; and repeating the step of fitting by obtaining another set of polygons until a predetermined termination condition is satisfied.

According to another aspect of the present invention, there is provided a method for obtaining three-dimensional shape data in analytic surface expression form by using polygonal shape data in which at least a portion of a shape is approximated by a combination of a plurality of polygons, the method comprising: selecting at least one or more polygons from the polygonal shape data in accordance with a predetermined selection criterion; and calculating an analytic surface to be assigned for the one or more polygons.

According to another aspect of the present invention, there is provided an apparatus for generating three-dimensional shape data of analytic surface expression, the apparatus comprising: a storage configure to store polygonal shape data in which at least a portion of a shape is approximated by a combination of a plurality of polygons; a shape data I/O interface configure to read the polygonal data from the storage; and an analytic surface fitting device coupled to the shape data I/O interface, including: a generation device configured to generate a set of polygons from the polygonal shape data, each of the polygons satisfying a predetermined selection criterion; an analytic surface computation device configured to compute a shape parameter of analytic surface, the analytic surface being fitted in place of the obtained set of polygons; and a fitting process controlling device configured to control a fitting process by activating the generation device and analytic surface computation device based on a predetermined termination condition.

According to still another aspect of the present invention, there is provided an apparatus for generating three-dimensional shape data of analytic surface expression, the apparatus comprising: a storage configured to store polygonal shape data in which at least a portion of a shape is approximated by a combination of a plurality of polygons; a shape data I/O interface configure to read the polygonal data from the storage; and analytic surface fitting means coupled to the shape data I/O interface, including: generation means for generating a set of polygons from the polygonal shape data, each of the polygons satisfying a predetermined selection criterion; computation means for computing a shape parameter of analytic surface, the analytic surface being fitted in place of the obtained set of polygons; and fitting process controlling means for controlling a fitting process by activating the generation means and computation means based on a predetermined termination condition.

According to still another aspect of the present invention, there is provided an apparatus for obtaining three-dimensional shape data in analytic surface expression form by using polygonal shape data in which at least a portion of a shape is approximated by a combination of a plurality of polygons, the apparatus comprising: means for selecting at least one or more polygons from the polygonal shape data in accordance with a predetermined selection criterion; and means for calculating an analytic surface to be assigned for the one or more polygons.

According to still another aspect of the present invention, there is provided an article of manufacture comprising a computer usable medium having computer readable program code means embodied for obtaining three-dimensional shape data in analytic surface expression form by using polygonal shape data in which at least a portion of a shape is approximated by a combination of a plurality of polygons, the computer readable program code means comprising: computer readable program code means for causing a computer to select at least one or more polygons from the polygonal shape data in accordance with a predetermined selection criterion; and computer readable program code means for causing a computer to calculate an analytic surface to be assigned for the one or more polygons.

According to still another aspect of the present invention, there is provided an interference check method for checking the presence/absence of geometric interference between three-dimensional shapes using shape data in which at least a portion of a three-dimensional shape is approximately expressed by a combination of a plurality of polygons, the method comprising: obtaining shape data of analytic surface expression by fitting partial sets of the polygons to analytic surfaces; selecting one of an accuracy-oriented processing method and processing speed-oriented processing method of the interference check; selecting one of the shape data of polygon approximate expression and the shape data of analytic surface expression according to the selected processing method; and executing the interference check using the selected shape data.

According to still another aspect of the present invention, there is provided an interference check apparatus for checking the presence/absence of geometric interference between three-dimensional shapes using shape data in which at least a portion of a three-dimensional shape is approximately expressed by a combination of a plurality of polygons, comprising: an analytic surface fit processing device configured to obtain shape data of analytic surface expression by fitting partial sets of the polygons to analytic surfaces; a storage configured to store the shape data of the three-dimensional shape approximately expressed by polygons, and corresponding shape data of analytic surface expression in association with each other; a computation mode selecting device configured to select one of an accuracy-oriented computation mode and processing speed-oriented computation mode of the interference check; a shape data selecting device configured to select one of the shape data of polygon approximate expression and the shape data of analytic surface expression according to the computation mode selected by the computation mode selecting device; and an interference check device configured to execute the interference check process using the shape data selected by the shape data selecting device.

According to still another aspect of the present invention, there is provided an article of manufacture comprising a computer usable medium having computer readable program code means embodied for checking the presence/absence of geometric interference between three-dimensional shapes using shape data in which at least a portion of a three-dimensional shape is approximately expressed by a combination of a plurality of polygons, the computer readable program code means comprising: computer readable program code means for causing a computer to obtain shape data of analytic surface expression by fitting partial sets of the polygons to analytic surfaces; computer readable program code means for causing a computer to select one of an accuracy-oriented processing method and processing speed-oriented processing method of the interference check; computer readable program code means for causing a computer to select one of the shape data of polygon approximate expression and the shape data of analytic surface expression according to the selected processing method; and computer readable program code means for causing a computer to execute the interference check using the selected shape data.

BRIEF DESCRIPTION OF THE SEVERAL VIEWS OF THE DRAWING

FIG. 13 shows addition of new polygons that can be fitted;

FIG. 14 shows determination of fourth reference polygons;

FIG. 15 shows neighboring polygons that satisfy a criterion for the fourth reference polygons;

FIG. 16 shows polygons which are added and fitted;

FIG. 19 shows a result after fitting destinations have been changed;

FIG. 20 is a view for explaining categories and definitions of tori;

DETAILED DESCRIPTION OF THE INVENTION

First Embodiment

The first embodiment of the present invention will be described below.

Figure 1:
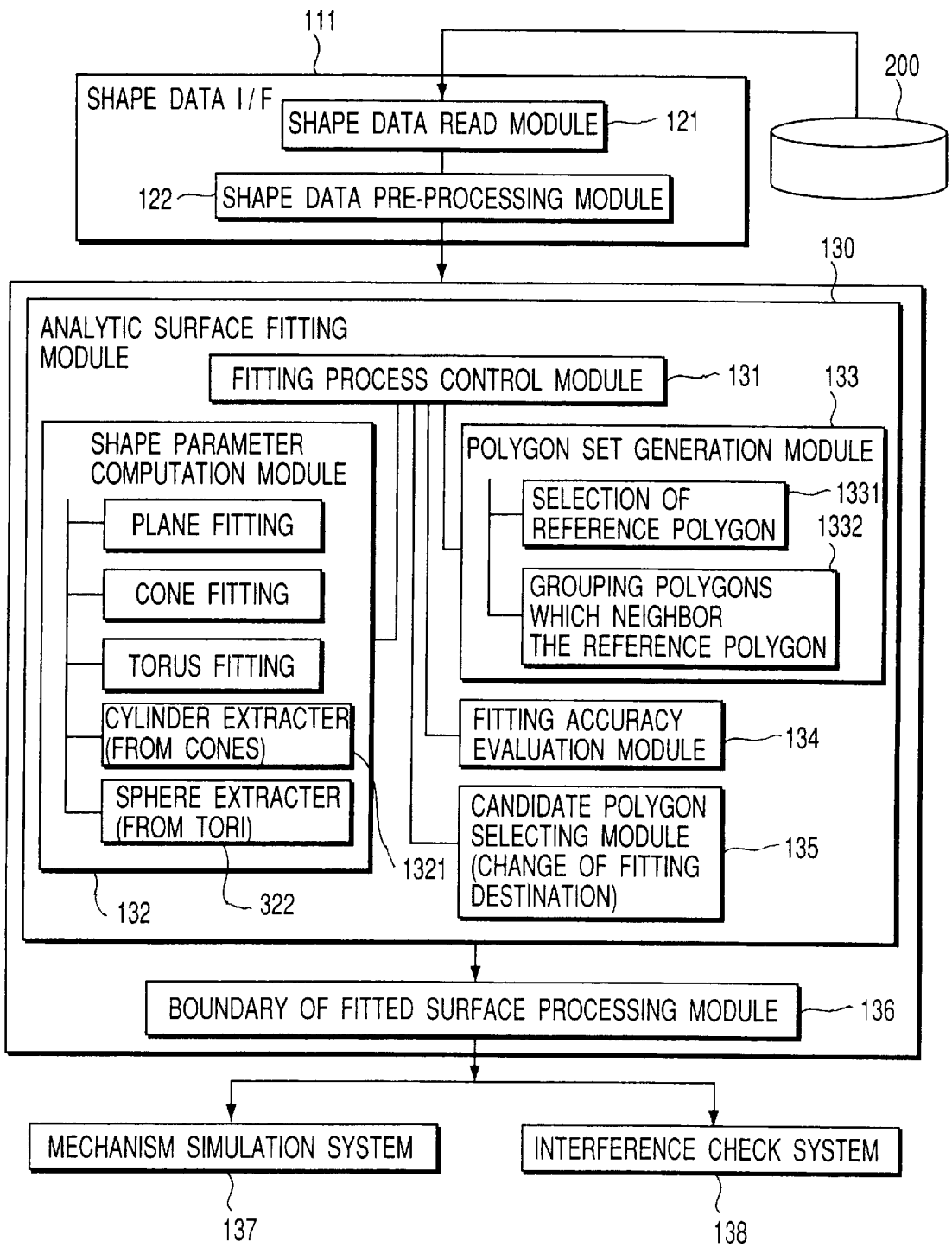
FIG. 1 shows a functional block diagram of an apparatus according to the first embodiment of the present invention.

FIG. 1 shows a functional block diagram of an apparatus according to the first embodiment of the present invention. As shown in FIG. 1, the apparatus comprises a shape data interface (I/F) 111, an analytic surface fitting module 130, a shape parameter computation module 132, a polygon set generating module 133, a fitting accuracy evaluation module 134, a candidate polygon selecting module 135, and a boundary of fitted surface processing module 136.

Shape data 200 inputted to the apparatus of this embodiment is three-dimensional data of objects by polyhedron approximation like in VRML. The apparatus of this embodiment is coupled to a mechanism simulation system 137 and an interference check system 138.

Figure 2:
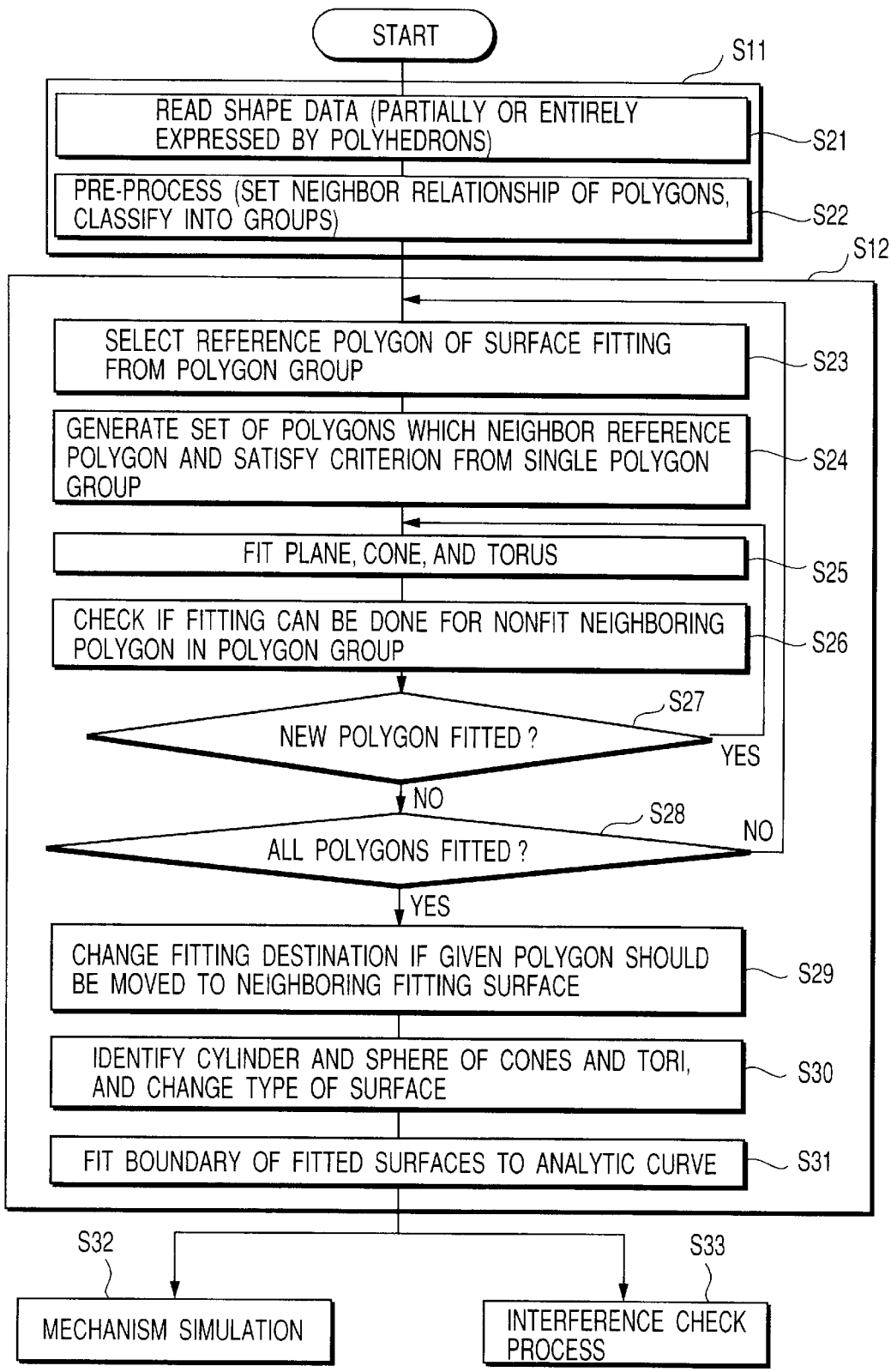
FIG. 2 is a schematic flow chart showing a process of the apparatus of the first embodiment.

FIG. 2 is a schematic flow chart showing a process of the apparatus of the first embodiment. In this flow chart, a portion bounded by S11 indicates the input step, and a portion bounded by S12 indicates the analytic surface fitting step. Steps S21 to S31 show detailed processing steps as an implementation example of input step S11 and analytic surface fitting step S12. The results obtained by input step S11 and analytic surface fitting step S12 are used in a mechanism simulation S32 and an interference check process S33.

The processing contents in steps S21 to S31 in FIG. 2 will be described in detail below.

In this processing, a fitting process control module 131 shown in FIG. 1 activates modules necessary for executing processes constituting the fitting process of analytic surface to the read polygon data.

In shape data read step S21, shape data which is partially or entirely expressed by polyhedrons is read from, e.g., a file 200 or the like. Each of polyhedrons will be referred to as a "polygon". This process is performed by a shape data read module 121.

Figure 3:
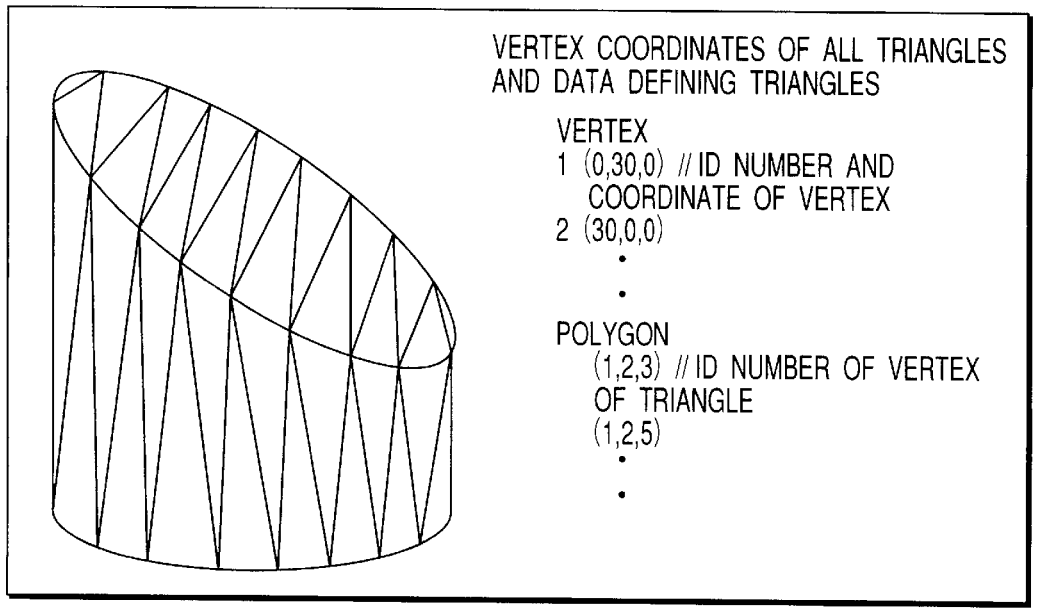
FIG. 3 shows an example of three-dimensional shape data approximately expressed by combinations of a plurality of polygons.

FIG. 3 shows an example of shape data in which the entire three-dimensional shape is approximately expressed by a combination of a plurality of polyhedrons. This data corresponds to a three-dimensional shape obtained by cropping an infinite cylindrical surface by two surfaces. Vertex data are listed as combinations of ID numbers and coordinate values, and triangles are described by ID number sequences of vertices. Such shape data of polyhedron approximate expression has huge numbers of vertices and polygons, and a larger data size than shape data of analytic surface expression (to be described later).

In this specification, an analytic surface is defined by a quadratic surface or a combination thereof.

Figure 4:
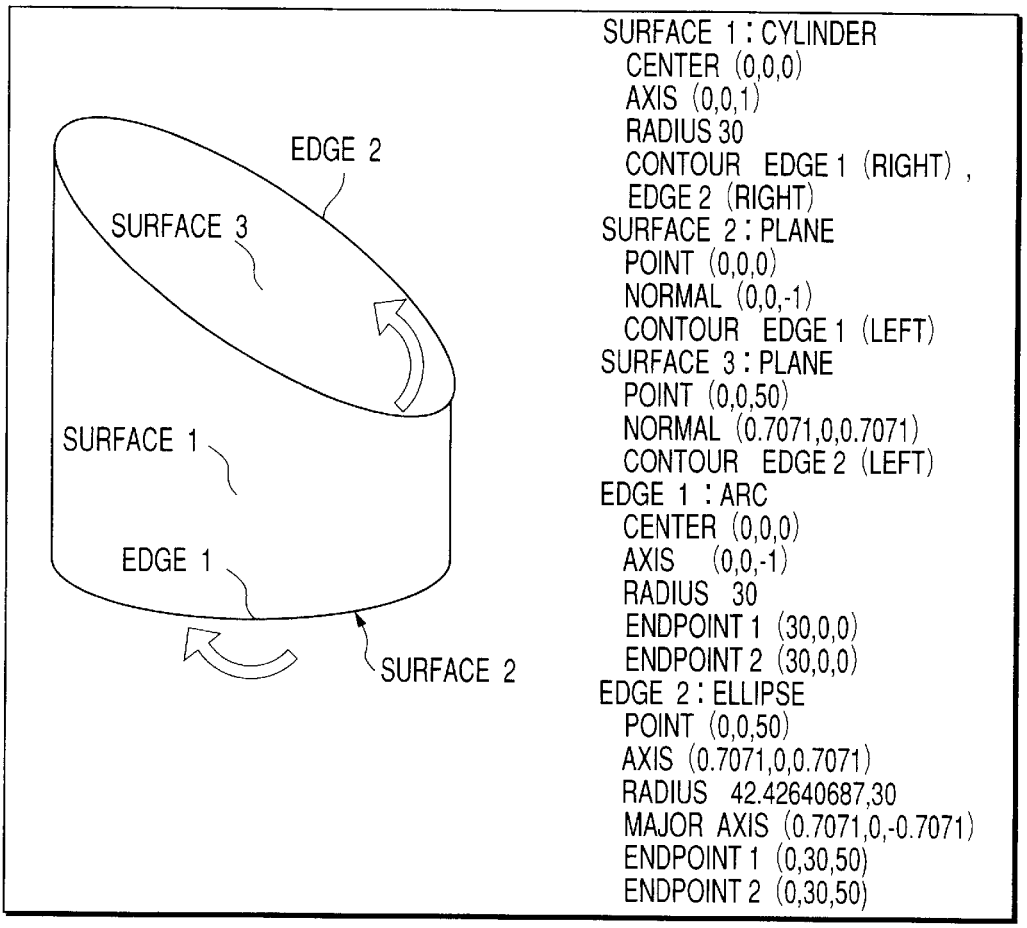
FIG. 4 shows an example of shape data of analytic surface expression generated based on shape data of polyhedron approximate expression shown in FIG. 3.

FIG. 4 shows an example of the shape data of analytic surface expression generated based on the shape data of polyhedron approximate expression shown in FIG. 3. As for a cylindrical surface, the coordinate value of one point on its axis and a direction vector of the axis are output to express the axis, and data of a radius is added thereto. As for a plane, the coordinate value of one point on a plane and a vector normal to that point are output. Since these data can only express an infinite cylinder and infinite plane, contour information is added. A right or left attribute attached to contour indicates the right or left side where the surface is present when viewed from the direction of an arrow in FIG. 4 (counterclockwise about the axis of the edge). An arc edge is expressed by center, axis, and radius data, and endpoints having an identical coordinate value indicate the entire perimeter of an arc. The same applies to an ellipse, which also has vector data of its long axis (major axis).

Figure 5:
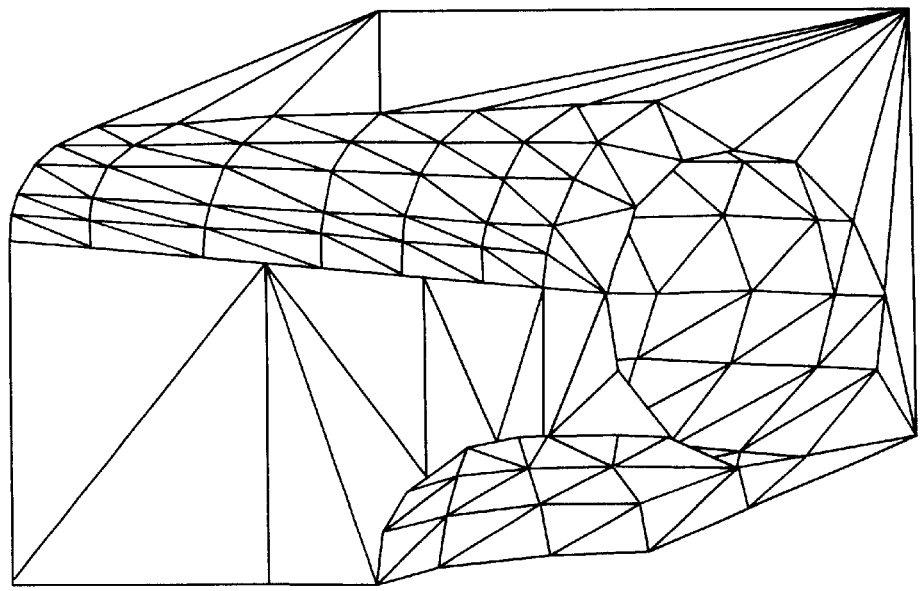
FIG. 5 shows an example of a three-dimensional object expressed by read polygon data (shape data)
Figure 6:
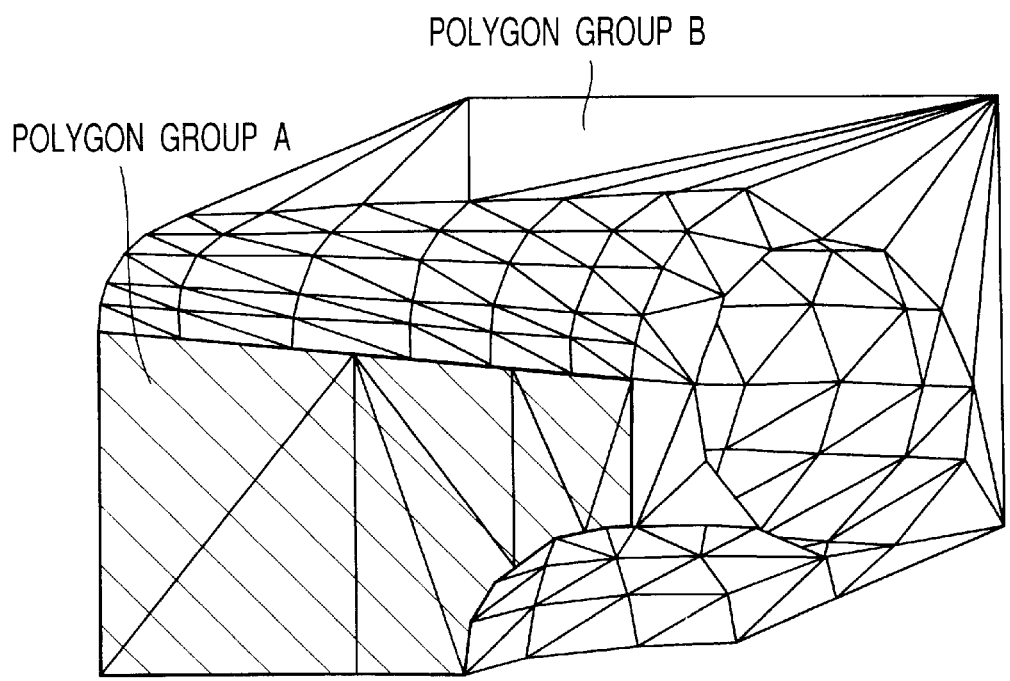
FIG. 6 shows contents of groups as the execution result of a pre-process.

FIG. 5 shows an example of a three-dimensional object expressed by polygon data (shape data) read in shape data read step S21. FIG. 6 shows the contents of groups (polygon groups A and B) as the execution result of pre-processing step S22.

In pre-processing step S22, it is checked if neighboring polygons have a common ridgeline by determining if they have identical endpoints. If identical ridgelines are present between two polygons, it is determined that these two polygons neighbor via a common ridgeline. All polygons are searched for such neighbor relationship, and the found relationships are stored as attribute information of polygons. Tracking the stored neighbor relationships of polygons, polygons that can reach each other are classified into one group. In the preferred embodiment, polygons are classified into a plurality of groups in advance. If the following processes are performed in consideration of the grouping, the overall processing speed can be improved. This process is performed by a shape data pre-processing module 122.

Figure 7:
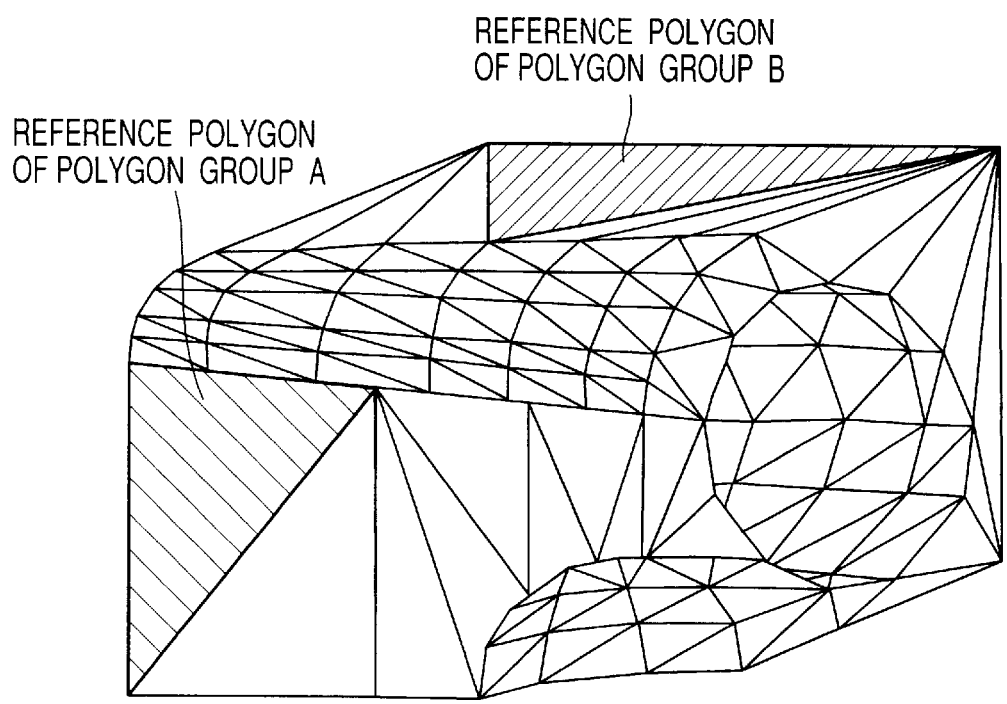
FIG. 7 shows reference polygons selected for respective groups.

In step S23 of reference polygon selection for surface fitting, reference polygons are respectively selected from polygon groups A and B. In this embodiment, a polygon having the largest area is selected from a group of polygons. FIG. 7 shows reference polygons respectively selected from groups A and B. This process of selection of reference polygon 1331 is performed by a polygon set generation module 133.

In step S24 of polygon set generation, a set of polygons which satisfy the following criteria is generated by tracking polygons in turn from a polygon that neighbors each reference polygon selected in reference polygon selection step S23. That is, polygons which satisfy criteria: neighboring polygons make an angle which is equal to or smaller than a predetermined angle, and a polygon makes an angle which is equal to or smaller than a predetermined angle with the reference polygon selected in reference polygon selection step S23 are selected. Sets of polygons which satisfy neighbor criteria are hatched in FIG. 8. This process of grouping polygons that neighbor the reference polygon 1332 is performed by the polygon set generation module 133.

Note that the set of polygons may be generated not depending on the reference polygon but on another criteria of polygon selection.

In fitting step S25 of a plane, cylindrical surface, and torus, attempts are made to fit the polygon sets selected in the previous step in a plane, conic surface, and torus.

The torus has two definitions in accordance with the distance between the axis and sectional arcs, as shown in FIG. 20. In case of a definition 51 of the torus, that shape is called a "lemon portion of torus". In case of a definition 52 of the torus, that shape is called a "apple portion of torus". In fitting step S25, fitting is made for a plane, conic surface, lemon portion, and apple portion. Since a cylinder is a special expression of a cone, and a sphere is that of a torus (an intermediate shape between apple and lemon portions is a sphere), a cylinder and sphere are extracted last (cylinder/sphere identification step S30).

These processes (i.e., plane fitting, cone fitting, and torus fitting ) are performed by the shape parameter computation module 132.

It should be noted that the processing of extraction of the cylinder 1321 and sphere 1322 are performed by the computation module 132.

In neighboring polygon fitting step S26, assuming that the cone or torus is a fitting surface, it is checked if a neighboring, nonfit polygon can be fitted in the cone or torus with a sufficiently small error. As a result, if the number of polygons to be fitted increases, the fitted curved surface is modified to attain fitting with high accuracy (YES in branch step S27). The evaluation of the error in this process is performed by the fitting accuracy evaluation module 134. The nonfit polygon is selected by the polygon set generation module 133.

The polygon which is fitted in the aforementioned process is moved from the initial polygon set to a new one, and is managed together with attribute information (central position, direction of axis, and the like) indicating the type and the shape of surface in which that polygon is fitted. If polygons to be fitted still remain in the polygon set, the fitting process is repeated. Upon completing of fitting for all the polygon sets and polygons with the aforementioned processes ("YES" in branch process step S28), the flow advances to a fitting surface movement process S29.

The fitting surface reassignment process S29 is a process for further improving the fitting result. In the case where a neighboring polygon is fitted in a different surface from a surface of polygon of interest, a fitting error between the polygon of interest and the neighboring polygon's surface is computed and is compared with current error. If the fitting error decreases, the polygon of interest is reassigned to the neighboring polygon's surface. By sequentially executing such process for all the polygons, the initial fitting result can be further improved. The module 135 selects such candidate of polygons with reference to the result of the evaluated fitting accuracy by the fitting accuracy evaluation module 134.

A termination condition of the above fitting process is not limited only such a condition in which all of the polygons are fitted to any one of analytic surfaces, but is adequately defined, for example, depending on at least one condition of a given fitting error, the amount of the shape data in analytic surface expression form, and the corresponding amount of the polygonal shape data. This termination condition may permits the polygon of non-fitting when, in the state that the fitting error goes within the allowable range and the fitting process can be terminated, the non-fitting polygon data has an advantage over the data amount. In this case, the fitting process is terminated without fitting the non-fitting polygon to the analytic surface.

Therefore, as shown in FIGS. 9 to 18, the first to fifth reference polygons are selected in turn to execute fitting. Respective portions of a three-dimensional object are fitted in a plane, cone, torus apple portion, torus lemon portion, and the like.

Figure 8:
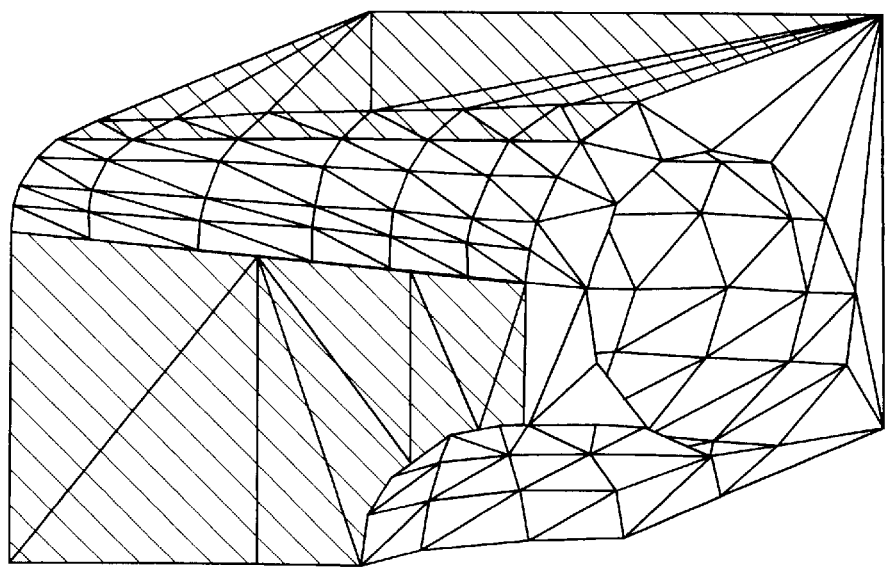
FIG. 8 shows a set of polygons that satisfy neighbor criteria.
Figure 9:
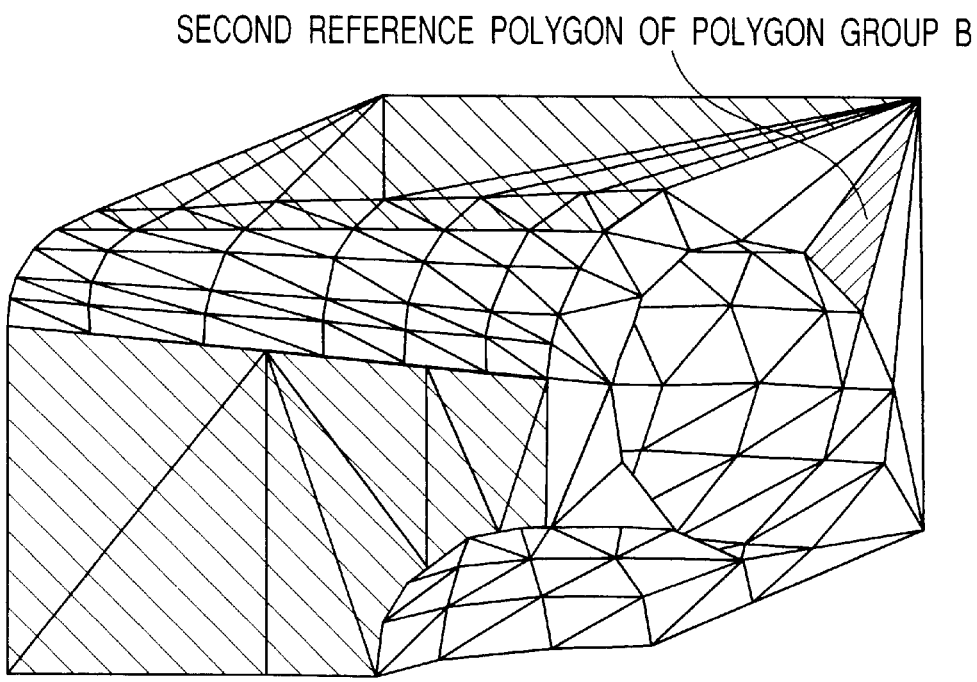
FIG. 9 shows determination of second reference polygons.
Figure 10:
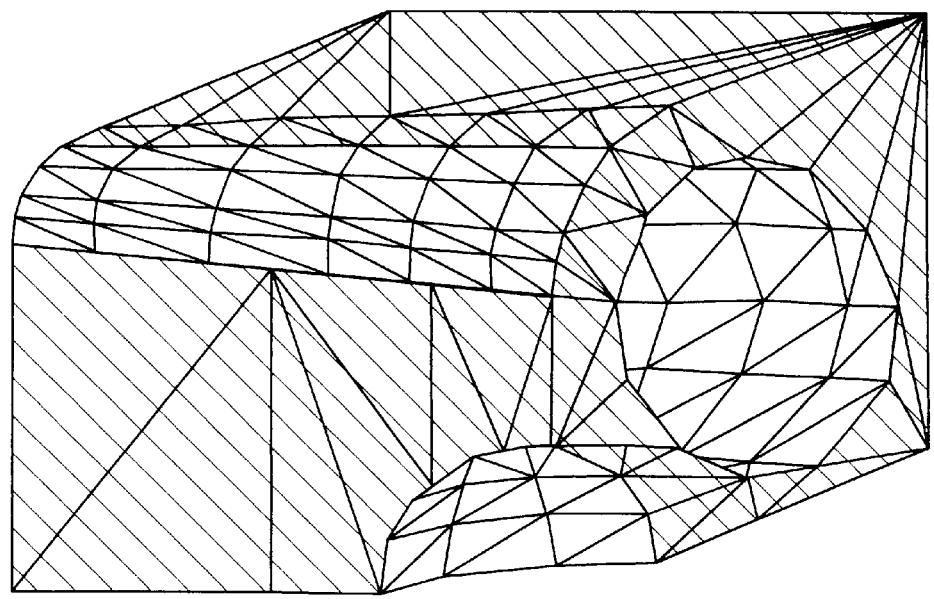
FIG. 10 shows neighboring polygons that satisfy criteria for the second reference polygons.
Figure 11:
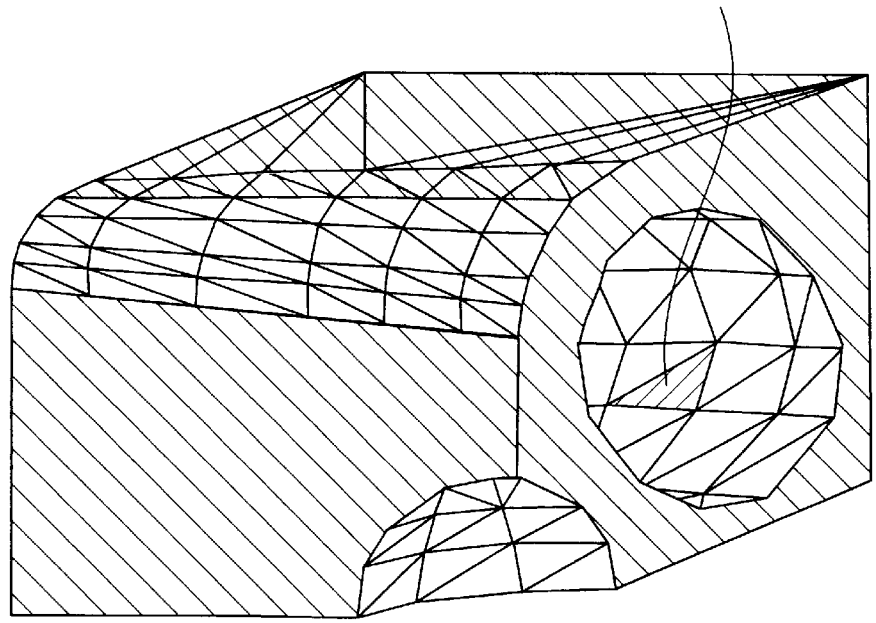
FIG. 11 shows determination of third reference polygons.
Figure 12:
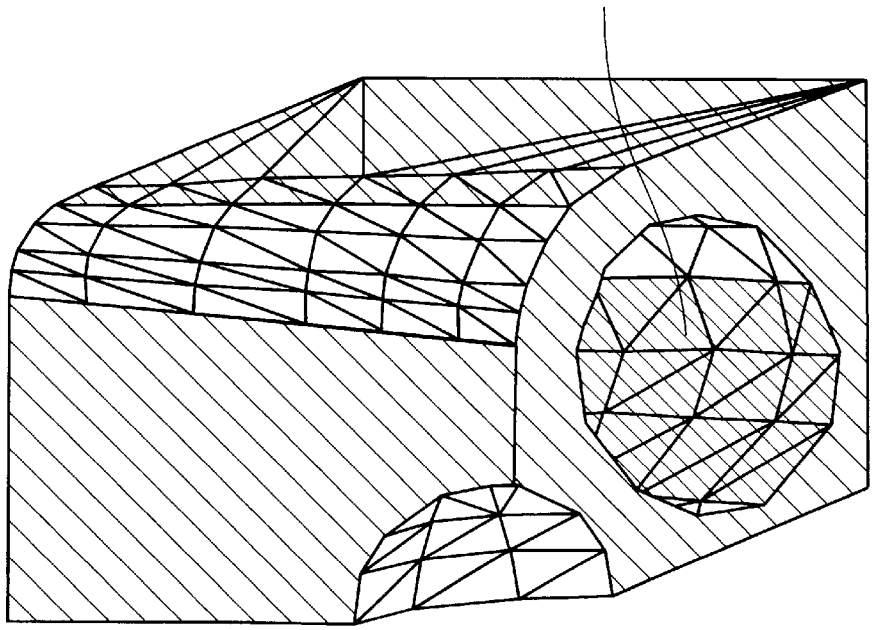
FIG. 12 shows neighboring polygons that satisfy a criterion for the third reference polygons.
Figure 17:
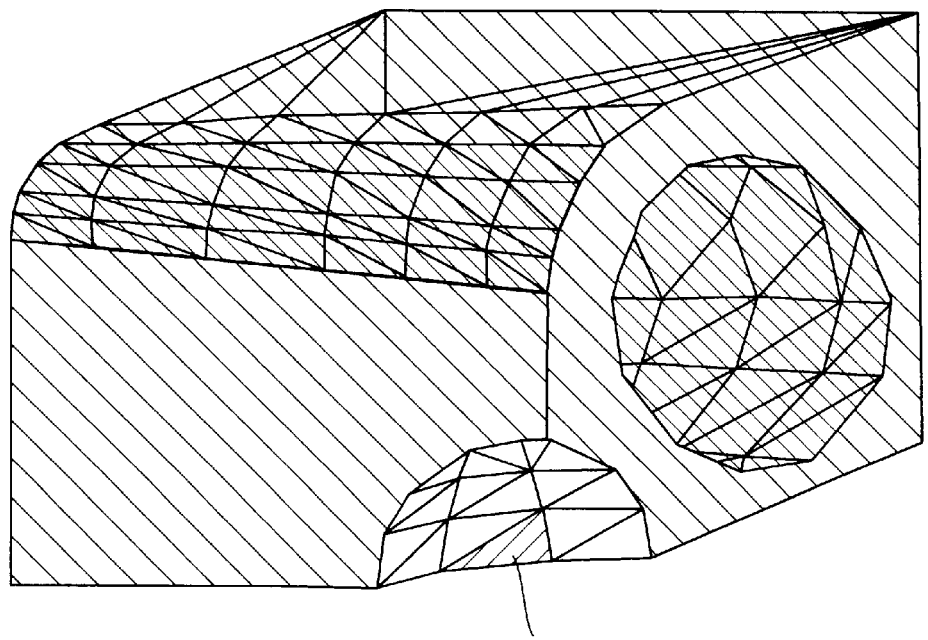
FIG. 17 shows determination of fifth reference polygons.
Figure 18:
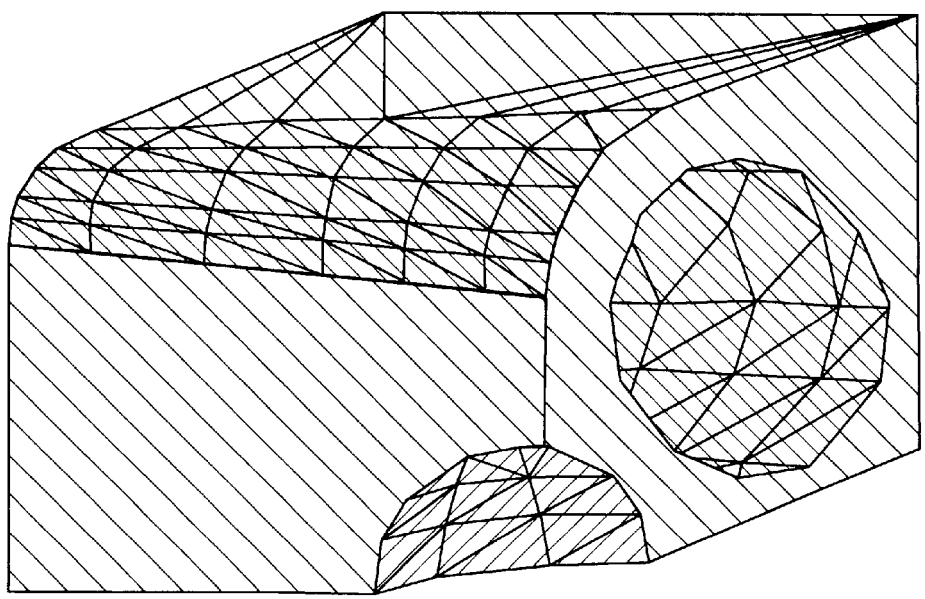
FIG. 18 shows neighboring polygons that satisfy a criterion for the fifth reference polygons.

In FIG. 8, a polygon set generated from the reference polygon contains polygons which should belong to another surface (conic surface). The fitting destinations of such polygons are modified in step S29 in FIG. 2. FIG. 18 shows the state before step S29 in FIG. 2 is executed. In this step, all the fitting results are verified again to check if each polygon is fitted in the most appropriate surface. As a result, the most appropriate fitting result is obtained, as shown in FIG. 19.

In cylinder/sphere identification step S30, a cylinder/sphere is identified, and the type of surface is changed in correspondence with the identification result.

Since fitting is done for data which is not an analytic surface, the fitting result inevitably contains errors. Such errors form gaps in a result shape obtained by projecting onto fitted surfaces.

In boundary analytic curve fitting step S31, fitting is done so that the boundary between the fitted surfaces becomes a straight line or arc. After this process, the shape expression becomes simpler, and high-speed processing can be expected for the final shape data. This process is performed by the boundary of fitted surface processing module 136. Suchlike analytic curve is not limited only said line or arc. The analytic curve may include various kind of quadratic curve.

Now, a practical use example of the fitting results in analytic surfaces by the shape expression process shown in FIG. 2 in a so-called mechanism simulation process (mechanism simulation step S32) will be explained.

Figure 21:
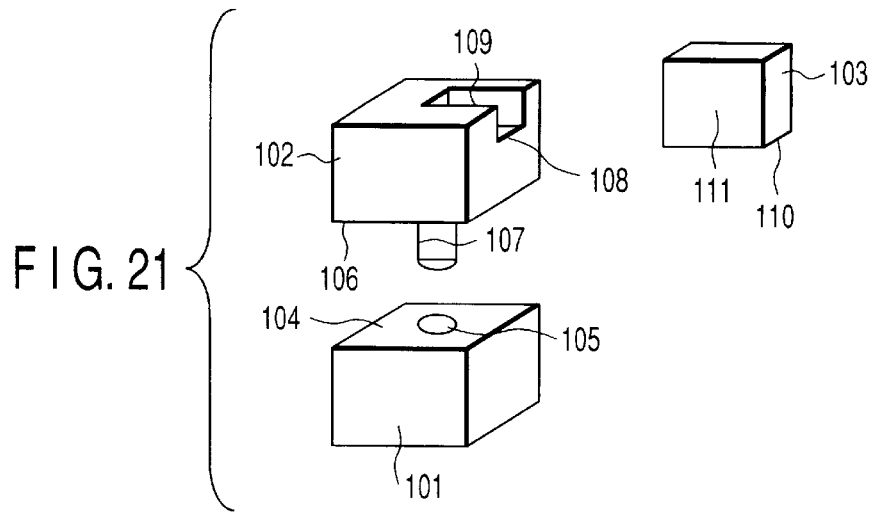
FIG. 21 shows shapes that have already been fitted in analytic surfaces as objects that are to undergo a mechanism simulation.

FIG. 21 shows an example of shapes already fitted in analytic surfaces.

In order to attain assembly in this example, relationship information indicating that there are three three-dimensional shapes, i.e., components 101, 102, and 103, a plane 104 as a partial shape of the component 101 coincides with a plane 106 as a partial shape of the component 102, and a cylindrical surface 105 is coaxial with a cylindrical surface 107 is input.

Likewise, as for the components 102 and 103, information indicating a coincidence relationship between planes 108 and 110, and that indicating a coincidence relationship between planes 109 and 111 are input to attain assembly.

All these partial shapes such as cylinders, planes, and the like are obtained in analytic surface fitting surface S12 mentioned above. According to the present invention, even when no actual data like a cylinder is present, a cylindrical shape or the like is automatically recognized by fitting, thus allowing assembly modeling.

Figure 22:
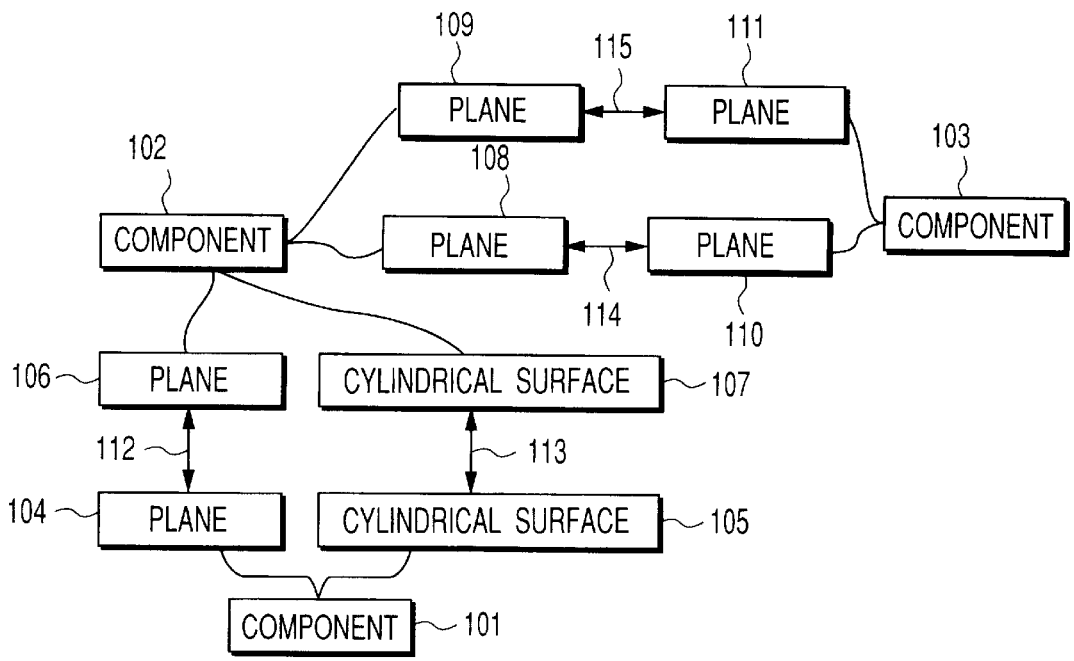
FIG. 22 shows the storage format of relation information associated with FIG. 21 in a storage means such as a memory or the like of a computer in the form of a graph.

FIG. 22 expresses the storage format of relation information associated with FIG. 21 in a storage means such as a memory or the like of a computer in the form of a graph.

In addition to three-dimensional shape information and partial shape information, coincidence relationships 112, 114, and 115 between planes, and a coaxial relationship 113 between cylinders are available as data. A function of computing the relative positional relationship among the components 101, 102, and 103 from these pieces of information is provided as software in the form of a geometric constraint process library. 3D-DCM version 2.1.0 available from D-Cubed Ltd., United Kingdom is an example of such product. More specifically, local coordinate systems unique to components are set for individual components, and the positional relationship among components are expressed in the form of a transformation matrix between these coordinate systems and a world coordinate system fixed in the space. More specifically, transformation matrices for expressing the positions of the components 101, 102, and 103 are automatically computed by the geometric constraint process library on the basis of the coincidence relationships and the like shown in FIG. 22.

Figure 23:
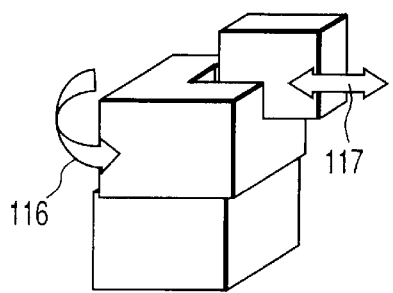
FIG. 23 shows an example of the positional relationship among components, which is computed to satisfy all coincidence relationships defined among partial shapes, i.e., all constraint relationships among partial shapes.

FIG. 23 shows an example of the positional relationship among components, which is computed to satisfy all coincidence relationships defined among partial shapes, i.e., all constraint relationships among partial shapes. That is, FIG. 23 shows the positions of components obtained by applying the transformation matrices of the components automatically computed by the geometric constraint process library to the shape data of the components. In this way, if analytic surfaces of cylinders, cones, spheres, and the like have been defined, kinematic pair relationships such as coincidence, coaxial, and the like among them are defined, and the positions, postures, and motions among components can be computed based on these relationships.

For details of mechanism simulation, refer to U.S. patent application Ser. No. 09/371,843 (Japanese Patent Application No. 11-234687), "METHOD FOR CREATING ASSEMBLY MODEL" filed by the present applicant, the entire contents of which are incorporated herein by reference.

As described above, according to the first embodiment, analytic surface expression data which allows easy handling can be obtained from shape data of a three-dimensional object which is expressed by polygons like VRML. Hence, assembly modeling, mechanism simulation, and the like which can be executed by a specific CAD system alone for shape data by polyhedron approximation such as VRML or the like can be executed.

In the description of the first embodiment, a reference polygon is selected in a polygon set, and an analytic surface is fitted in a polygon set in which polygons neighbor the reference polygon and satisfy predetermined criteria (predetermined polygons make certain angles with each other). Alternatively, an equivalent polygon set may be obtained based on another process without selecting any reference polygon.

Second Embodiment

The second embodiment relates to a discrimination process of the presence/absence of geometric interference among three-dimensional shapes modeled using a computer.

In polyhedron (polygon) approximation such as VRML or the like, the number of polygons tends to be huge, and when geometric interference among shapes is detected by computing them using a computer, a very long computation time is required. For this reason, it is often disadvantageous to directly use shape data obtained by polyhedron approximation in interference check.

On the other hand, when interference check is made based on analytic surfaces or the like with a small data size in place of a partial set of polyhedrons, such implementation is advantageous in terms of computation time. But when fitting results of analytic surfaces contain serious errors, interference check may produce errors due to such serious errors, and the shape data obtained by polyhedron approximation is often advantageous in terms of interference detection accuracy.

When shape data obtained by polyhedron approximation such as VRML or the like is used in interference check, although no interference takes place in practice, interference may often be erroneously detected as a result of polyhedron approximation when no interference naturally occurs like fitting of a shaft and hole as cylinders having identical diameters. In such case, the user must individually check if that interference actually occurs or is erroneously detected as a result of polyhedron approximation. Therefore, it is important to exclude wrong interference check results caused by the internal expression of shapes, and to efficiently provide only information that the user wants.

However, no mechanism for flexibly creating appropriate shape data in accordance with the required processing time and accuracy, and applying them to the interference check function has been proposed yet, and the interference check function cannot be effectively utilized.

Hence, this embodiment provides an apparatus for flexibly checking the presence/absence of geometric interference among three-dimensional shapes in accordance with the required processing time and accuracy.

Figure 24:
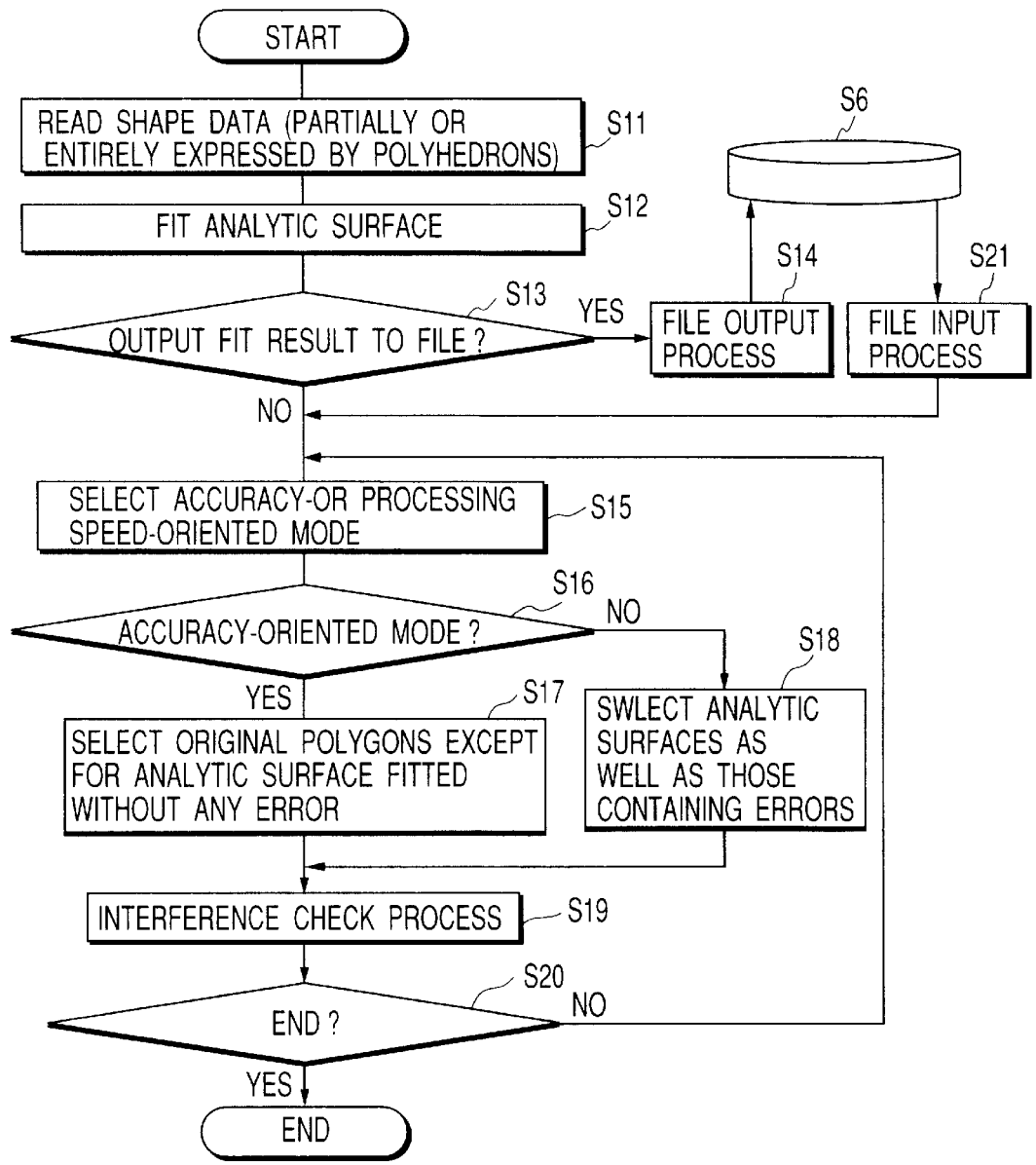
FIG. 24 is a flow chart showing a series of steps from read of shape data that pertain to polyhedron approximate expression to the end of interference check according to an embodiment of the present invention.
Figure 25:
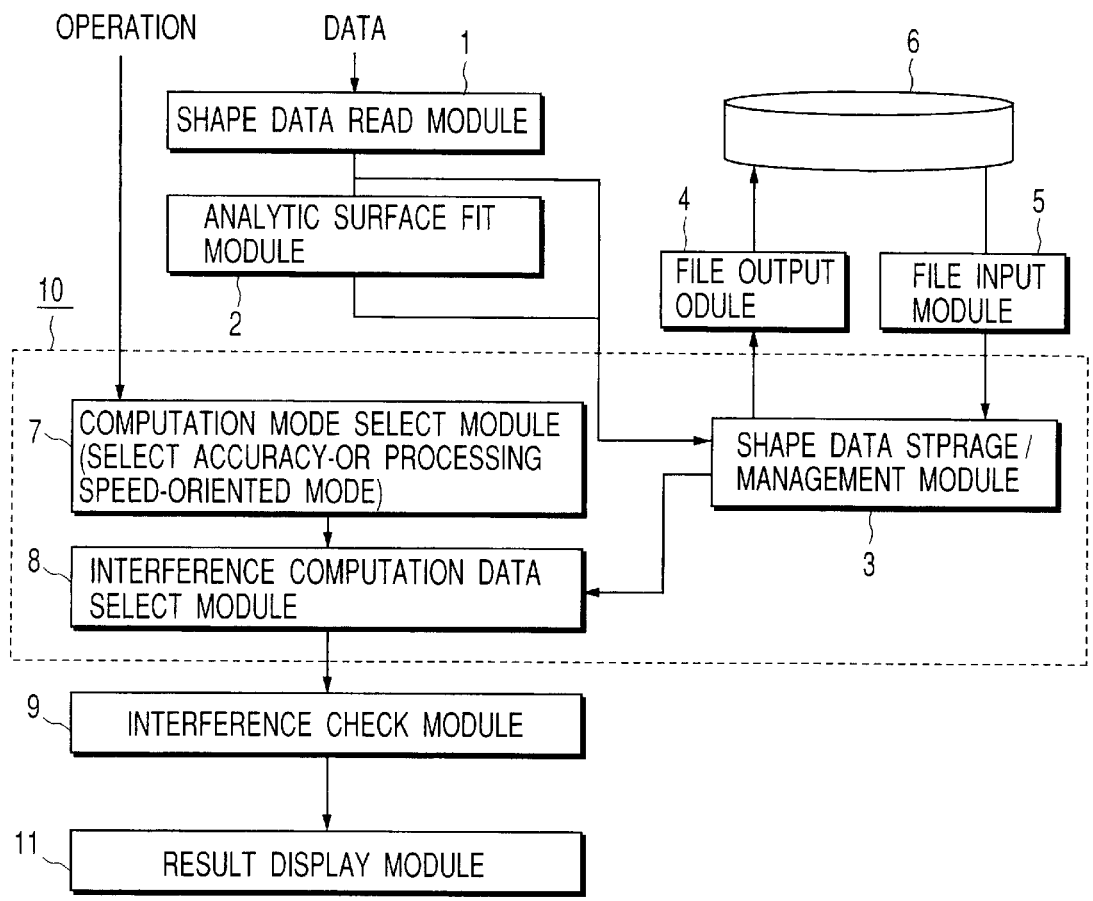
FIG. 25 is a block diagram showing an example of the configuration of a program that implements a series of steps from read of shape data that pertain to polyhedron approximate expression to the end of interference check on a computer.

FIG. 24 is a flow chart showing a series of steps from read of shape data associated with polyhedron expression to the end of interference check according to the third embodiment of the present invention, and FIG. 25 is a block diagram showing an example of the arrangement of a program product that implements such steps on a computer.

As shown in FIG. 25, the program product comprises a shape data read module 1, analytic surface fit module 2, shape data storage/management module 3, file output module 4, file input module 5, magnetic disk 6, interference check data supply module 10, interference check module 9, and result display module 11. When shape data of analytic surface expression, which is generated by the analytic surface fit module 2, need not be permanently stored, the file output module 4, file input module 5, and magnetic disk 6 may be eliminated.

The interference check data supply module 10 comprises the shape data storage/management module 3, a computation mode select module 7, and an interference computation data select module 8.

In step S11 shown in FIG. 24, shape data of polyhedron approximate expression is read. The shape data read module 1 reads shape data associated with a given mechanism component which is to undergo interference check from, e.g., a database or the like of a mechanism component simulation system (not shown). The shape data of a mechanism component corresponds to a three-dimensional shape, which is partially or entirely approximately expressed by a combination of a plurality of polyhedrons (polygons).

The shape data of polyhedron approximate expression read by the shape data read module 1 is supplied to the shape data storage/management module 3, and also to the analytic surface fit module 2.

In step S12, an analytic surface fit process based on the shape data of polyhedron approximate expression read in step S11 is executed. The analytic surface fit module 2 attempts to fit an arbitrary partial set of polyhedrons to different analytic surfaces such as a plane, spherical surface, cylindrical surface, conic surface, torus, and the like to obtain shape data of approximate analytic surface expression. The contents of the analytic surface fit process are the same as that in the above embodiment, and a detailed description thereof will be omitted.

The shape data storage/management module 3 stores and manages the shape data of analytic surface expression generated in step S12 in association with the corresponding shape data of polyhedron approximate expression. Such shape data storage/management module 3 uses a main storage device comprising a random access memory or the like that allows read/write at high speed. Since the shape data of analytic surface expression is stored and managed in association with the corresponding shape data of polyhedron approximate expression, a process for designating an analytic surface to obtain a corresponding initial polygon set, or the like can be made.

It is checked in step S13 based on, e.g., a user's instruction or the like if the analytic surface fit process result in step S12 is stored not only in the main storage device but also in a magnetic disk. If the result is stored in the disk (step S13=YES), the file output module 4 writes the shape data of analytic surface expression obtained as a result of the analytic surface fit process in the magnetic disk 6 (step S14). In general, since the analytic surface fit process requires a longer computation time than an interference check process later, when interference check is repeated for identical shape data, the analytic surface fit result stored in the magnetic disk 6 is read out and used in step S21 in place of executing the analytic surface fit process in every check, thus avoiding redundant computations and attaining high-speed processing.

If the result is not stored in the disk in step S13, the flow directly advances to step S15.

In step S15, an accuracy- or processing speed-oriented computation mode is selected. The computation mode select module 7 selects and determines one of a first computation mode in which accuracy-oriented interference check computations are made, and a second computation mode in which processing speed-oriented computations are made.

A selection criterion upon selecting such computation mode may be arbitrarily set. For example, in this embodiment, when a three-dimensional shape as an object has no motion, the accuracy-oriented first computation mode is selected; when the three-dimensional shape has a motion, the processing speed-oriented second computation mode is selected. As for the motion of the three-dimensional shape, predetermined determination is made based on user's operation (e.g., during animation display) or the like upon simulating a mechanism component using a model on a computer.

When the accuracy-oriented computation mode is selected (step S16=YES), the interference computation data select module 8 issues a data request to the shape data storage/management module 3 to select shape data (polygon) of polyhedron approximate expression of a portion other than those in which analytic surfaces are fitted without any errors. That is, the shape data of polyhedron approximate expression is used in interference check in place of the already obtained analytic surface expression, so as to prevent any errors due to the fit process (step S17).

Figure 26:
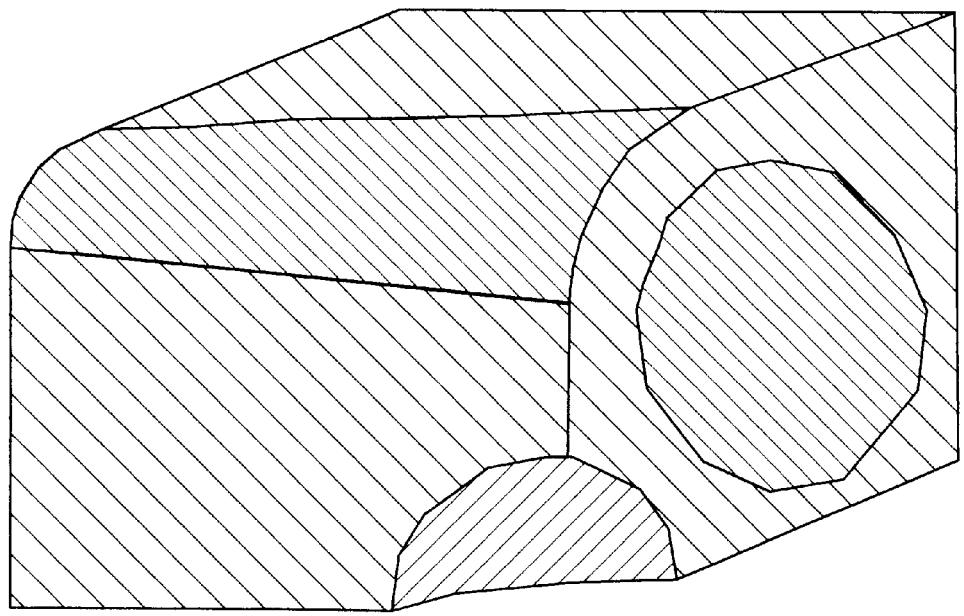
FIG. 26 shows a case wherein an analytic surface is accurately fitted in a three-dimensional shape shown in FIG. 19 (without errors)

FIG. 25 shows an example of polyhedron data of a three-dimensional shape provided by, e.g., VRML. In this polyhedron data, analytic surfaces (plane, cylindrical surface, conic surface, spherical surface, and the like) are accurately fitted (without any errors) as a result of the analytic surface fit process (step S12), as shown in FIG. 26. In this case, it is advantageous to conduct interference check using the fitted analytic surfaces in terms of both the processing speed and accuracy. Therefore, when analytic surfaces are accurately fitted, i.e., when no errors are produced upon fitting analytic surfaces, the subsequent processes (interference check) are executed using the fitted analytic surfaces independently of the computation mode selected.

Figure 27:
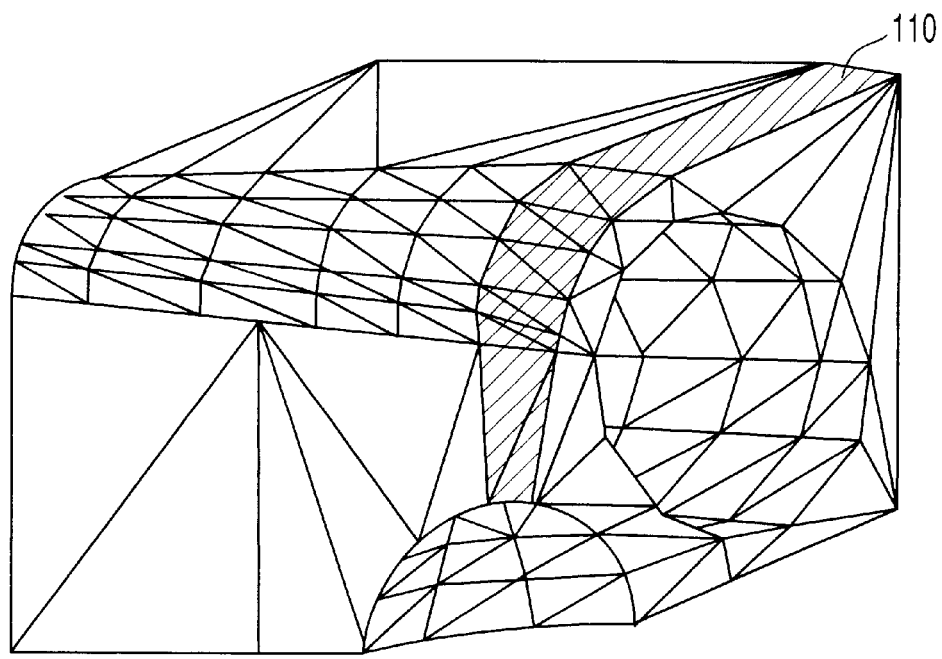
FIG. 27 is a view for explaining a case wherein analytic curve fitting produces errors for three-dimensional shape data which is different from that in FIG. 19.

Polyhedron data shown in FIG. 27 is data that pertains to a three-dimensional shape which is slightly different from that in FIG. 19, and is used to explain a case wherein the analytic surface fit process causes errors. In FIG. 27, a portion 110 is a slowly tapered portion, which is different from an approximate shape shown in FIG. 19. For example, the presence of this tapered portion often causes an error (analytic surface 111) in the analytic surface fit result.

An analytic surface fit error can be detected by a distance computation between a point on that analytic surface and a reference point (e.g., a point on a polyhedron corresponding to this point). The interference computation data select module 8 specifies the analytic surface 111 containing an error, and selects initial shape data of polyhedron approximation corresponding to this analytic surface 111.

Note that the analytic surface fit result may be displayed on the display screen, and the user may visually detect any fit errors. When the user explicitly designates the analytic surface 111 where an error has been produced, the interference computation data select module 8 selects initial shape data of polyhedron approximation corresponding to the designated analytic surface 111.

On the other hand, if the processing speed-oriented computation mode is selected (step S16=NO) in FIG. 24, a largest possible number of analytic surfaces are selected. The interference check process can be executed at higher speed if an increased number of portions have analytic surfaces selected. For example, in this embodiment, analytic surfaces are selected independently of the presence/absence of the aforementioned fit errors.

The shape data selected in step S17 or S18 are supplied to the interference check module 9. The interference check module 9 executes the interference check process on the basis of the supplied shape data (step S19). For example, CDM (Collision Detection Manager) available from D-Cubed Ltd., United Kingdom is known as a software library effective for implementing the interference check process, and interference detection among analytic surfaces can be detected at very high speed using that software library. Note that application of that software library is merely an example. The interference check result in step S19 is displayed on the result display module 11.

It is checked in step S15 if the interference check process is to end. If interference check is redone under different conditions in accordance with user's instruction or the like, the flow returns to step S15. At this time, the analytic surface fit result recorded in the magnetic disk 6 can be used, as described above. Without using the recorded result, a new analytic surface fit process under different conditions may be done.

Some modifications of this embodiment will be described below.

In this embodiment, in the accuracy-oriented computation mode, shape data of polyhedron approximate expression is selected for an analytic surface containing a fit error in place of the corresponding shape data of analytic surface expression, thus generating appropriate shape data corresponding to the processing method. However, analytic surface expression may be more advantageous than polyhedron approximate expression in terms of interference check accuracy in some cases.

FIGS. 9A and 9B are views for explaining such case. FIGS. 9A and 9B show the fitting state (shaft-hole pair) of a shaft (cylindrical surface) and hole when viewed from the axial direction of the hole. In practice, the hole diameter nearly matches the shaft diameter, but the shaft is slightly smaller than the hole for the sake of simplicity.

Figure 29A:
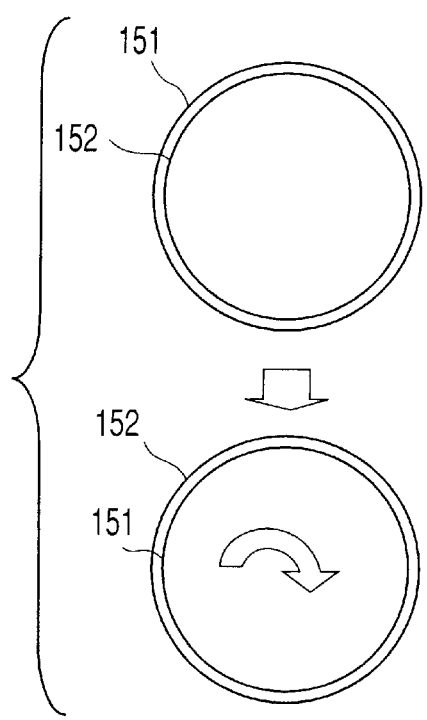
FIG. 29A shows fitting (shaft-hole pair) between a shaft (cylindrical surface) and hole by analytic surface expression.
Figure 29B:
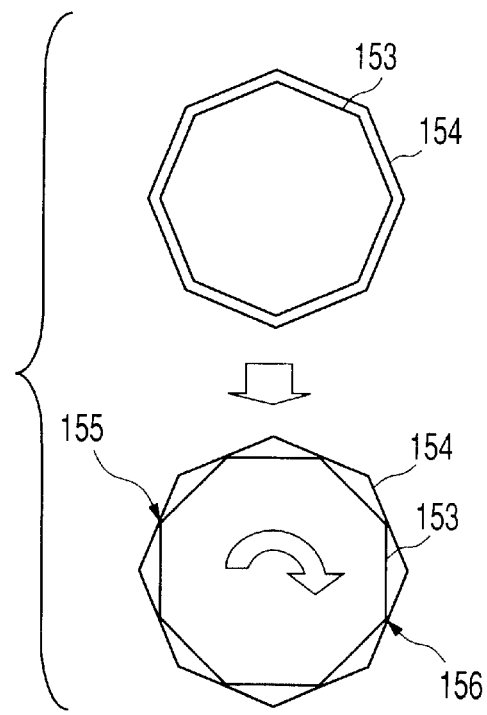
FIG. 29B shows fitting (shaft-hole pair) between a shaft (cylindrical surface) and hole by polyhedron expression.

As shown in FIG. 29A, when cylindrical surfaces as analytic surfaces are fitted in a shaft 151 and hole 152, no interference takes place when the shaft 151 and hole 152 rotate relative to each other (e.g., the shaft rotates relative to the immovable hole). By contrast, when no analytic surfaces are fitted in a shaft 153 and hole 154, which remain expressed by polyhedrons, if the shaft 153 and hole 154 rotate relative to each other, interference takes place depending on the rotational angle. Reference numerals 155 and 156 denote interference portions in this case. FIG. 29B shows an example wherein interference that never occurs in practice is erroneously detected due to polyhedron expression, and which is often found upon modeling and simulation of mechanism components. In such case, the shape data of analytic surface expression may be exclusively used independently of the computation mode.

As another modification, a plurality of analytic surface fit results or shape data of polyhedron approximate expression may be prepared on the basis of an allowable error value. In approximation of these three-dimensional shapes, if larger errors are set, the number of approximate surfaces decreases, and high-speed processing is guaranteed, but precision impairs. On the other hand, when smaller errors are set, the number of approximate surfaces increases, and accuracy can be improved, but the processing time is prolonged. In this embodiment, two different choices of shape data, i.e., analytic surface expression and polyhedron approximate expression, are available, but more choices may be provided. For example, accurate data, data with small errors, and data with large errors are prepared. These data are selectively used in accordance with the motion speed or the like in animation of a component to be checked. For example, when a three-dimensional object moves at high speed, data with large errors may be used to attain high-speed interference check, and when the motion of the object becomes slow, data with small errors may be selected. When the motion stops finally, accurate data may be used.

As still another modification, a three-dimensional shape may be redundantly and approximately expressed using analytic surfaces, thus improving accuracy and reliability of interference check.

Figure 28:
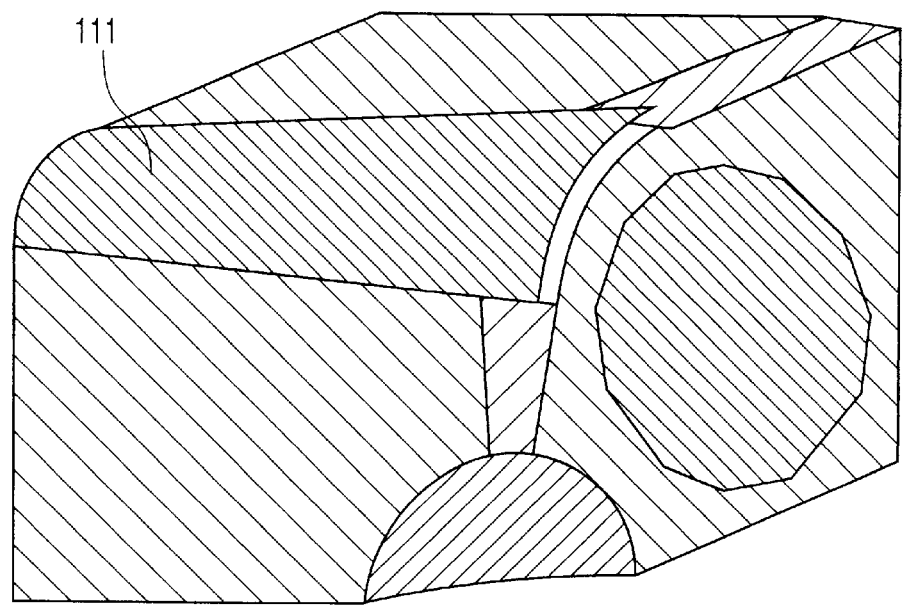
FIG. 28 shows fitting errors of the analytic surface for the three-dimensional shape shown in FIG. 27.
Figure 30:
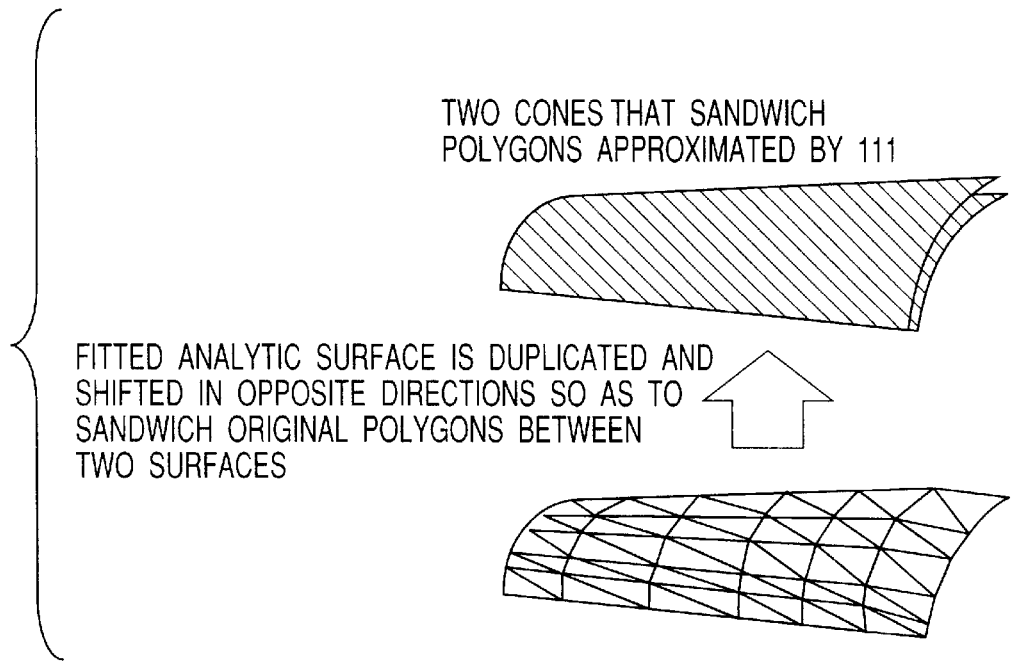
FIG. 30 is a view for explaining redundant approximate expression of a three-dimensional shape.

When very strict accuracy is required upon detecting the presence/absence of interference among components, since analytic curve expression shown in FIG. 28 contains fit errors, as described above, troubles or oversight may occur in interference check. Hence, a three-dimensional shape is redundantly and approximately expressed. More specifically, as shown in FIG. 30, original polygons are expressed by sandwiching them between an analytic surface 111 formed by a partial shape of an approximate conic surface, and another surface which has a common central axis to the analytic surface 111 and a smaller radius. If interference occurs on any surface, the presence of interference is determined. In this case, two approximate surfaces are inevitably used to sandwich polygons, and it is disadvantage for the interference check process in terms of time. However, the interference check process can be executed at sufficiently higher speed than a case using only shape data of polyhedron approximate expression. Even when an obstacle approaches a polygon set from any direction, as it collides against one of the two approximate surfaces, possibility of troubles and oversight in interference check can be excluded.

Figures 31A, 31B:
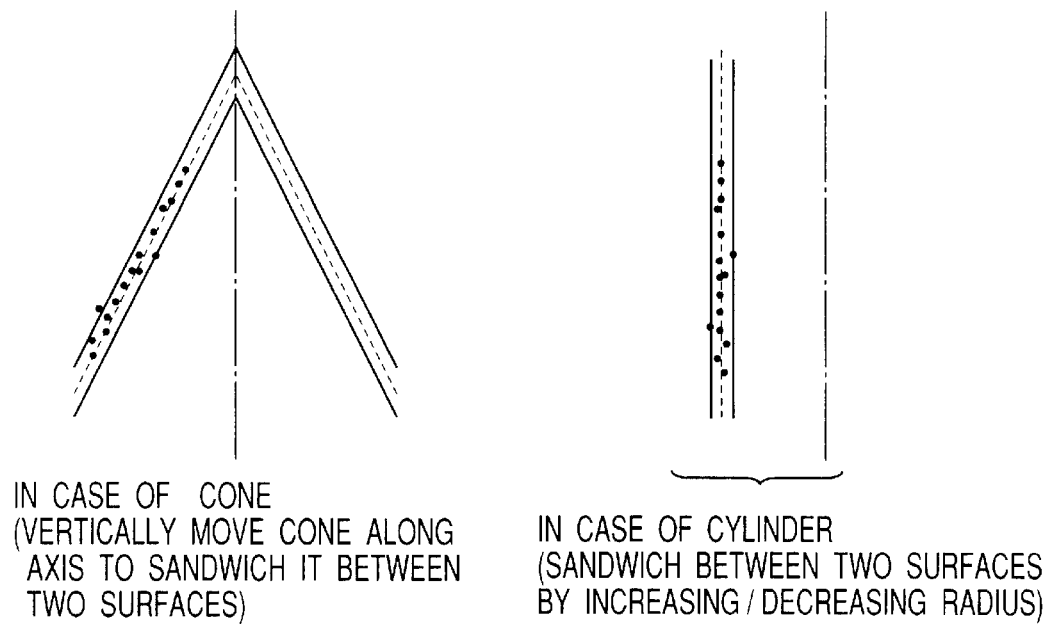
FIG. 31A is a view for explaining another redundant approximate expression of a three-dimensional shape.
FIG. 31B is a view for explaining still another redundant approximate expression of a three-dimensional shape.

FIG. 31 explains such principle of obtaining two surfaces in more detail to attain reliable interference check. In FIG. 31, the central axes of a fitted cone and cylindrical surface are indicated by the one-dashed lines, and the full circles indicate a state wherein the vertices of fitted polygons rotate about these central axes and are projected onto planes including the axes. The dotted lines indicate the fitted cone and cylindrical surface, but the dots indicated by the full circles are not always strictly located on the fit surfaces and slight interference may fail to be found. Hence, in a cone, two surfaces indicated by the solid lines are obtained by vertically moving the fitted cylinder along the axis to spuriously increase/decrease the radius at an original position. In case of a cylinder, a pair of cylinders indicated by the solid lines can be obtained by directly increasing/decreasing its radius.

As described above, according to the second embodiment, shape data of analytic surface expression that can be processed at high speed is effectively used, and when accurate computations are required, initial shape data of polyhedron approximate expression is used in addition to accurately fitted analytic surfaces, thus implementing flexible interference check in accordance with the required processing time and accuracy.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An interference check method for checking the presence/absence of geometric interference between three-dimensional shapes using shape data in which at least a portion of a three-dimensional shape is approximately expressed by a combination of a plurality of polygons, the method comprising:

obtaining shape data of analytic surface expression by fitting partial sets of the polygons to analytic surfaces;

selecting a processing speed-oriented processing method when the three-dimensional shape has a motion, and selecting an accuracy-oriented processing method when the three-dimensional shape has no motion;

selecting one of the shape data of polygon approximate expression and the shape data of analytic surface expression according to the selected processing method; and executing the interference check using the selected shape data.

2. A method according to claim 1, wherein said analytic surface includes at least one of a plane, cone, torus, sphere, and cylinder.

3. An interference check method for checking the presence/absence of geometric interference between three-dimensional shapes using shape data in which at least a portion of a three-dimensional shape is approximately expressed by a combination of a plurality of polygons, the method comprising:

obtaining shape data of analytic surface expression by fitting partial sets of the polygons to analytic surfaces;

selecting one of an accuracy-oriented processing method and processing speed-oriented processing method of the interference check;

selecting the shape data of analytic surface expression for a portion that does not contain any fit error to the analytic surface independently of the accuracy- or processing speed-oriented processing method;

selecting the shape data of polygon approximate expression for a portion that contains a fit error to the analytic surface when the accuracy-oriented processing method is selected, and selecting the shape data of analytic surface expression for that portion when the processing speed-oriented processing method is selected; and executing the interference check using the selected shape data.

4. A method according to claim 3, wherein said analytic surface includes at least one of a plane, cone, torus, sphere, and cylinder.

5. An interference check apparatus for checking the presence/absence of geometric interference between three-dimensional shapes using shape data in which at least a portion of a three-dimensional shape is approximately expressed by a combination of a plurality of polygons, comprising:

an analytic surface fit processing device configured to obtain shape data of analytic surface expression by fitting partial sets of the polygons to analytic surfaces;

a storage configured to store the shape data of the three-dimensional shape approximately expressed by polygons, and corresponding shape data of analytic surface expression in association with each other;

a computation mode selecting device configured to select a processing speed-oriented computation mode when the three-dimensional shape has a motion, and select an accuracy-oriented computation mode when the three-dimensional shape has no motion;

a shape data selecting device configured to select one of the shape data of polygon approximate expression and the shape data of analytic surface expression according to the computation mode selected by said computation mode selecting device; and an interference check device configured to execute the interference check using the shape data selected by said shape data selecting device.

6. An apparatus according to claim 5, wherein the analytic surface includes at least one of a plane, cone, torus, sphere, and cylinder.

7. An interference check apparatus for checking the presence/absence of geometric interference between three-dimensional shapes using shape data in which at least a portion of a three-dimensional shape is approximately expressed by a combination of a plurality of polygons, comprising:

an analytic surface fit processing device configured to obtain shape data of analytic surface expression by fitting partial sets of the polygons to analytic surfaces;

a storage configured to store the shape data of the three-dimensional shape approximately expressed by polygons, and corresponding shape data of analytic surface expression in association with each other;

a computation mode selecting device configured to select one of an accuracy-oriented computation mode and processing speed-oriented computation mode of the interference check;

a shape data selecting device configured to select the shape data of analytic surface expression for a portion that does not contain any fit error to the analytic surface independently of the accuracy or processing speed-oriented computation mode, and select the shape data of polygon approximate expression for a portion that contains a fit error to the analytic surface when the accuracy-oriented computation mode is selected, and select the shape data of analytic surface expression for that portion when the processing speed-oriented computation mode is selected; and an interference check device configured to execute the interference check using the shape data selected by said shape data selecting device.

8. An apparatus according to claim 7, wherein the analytic surface includes at least one of a plane, cone, torus, sphere, and cylinder.

* * * * *